UNITED STATES PATENT OFFICE.

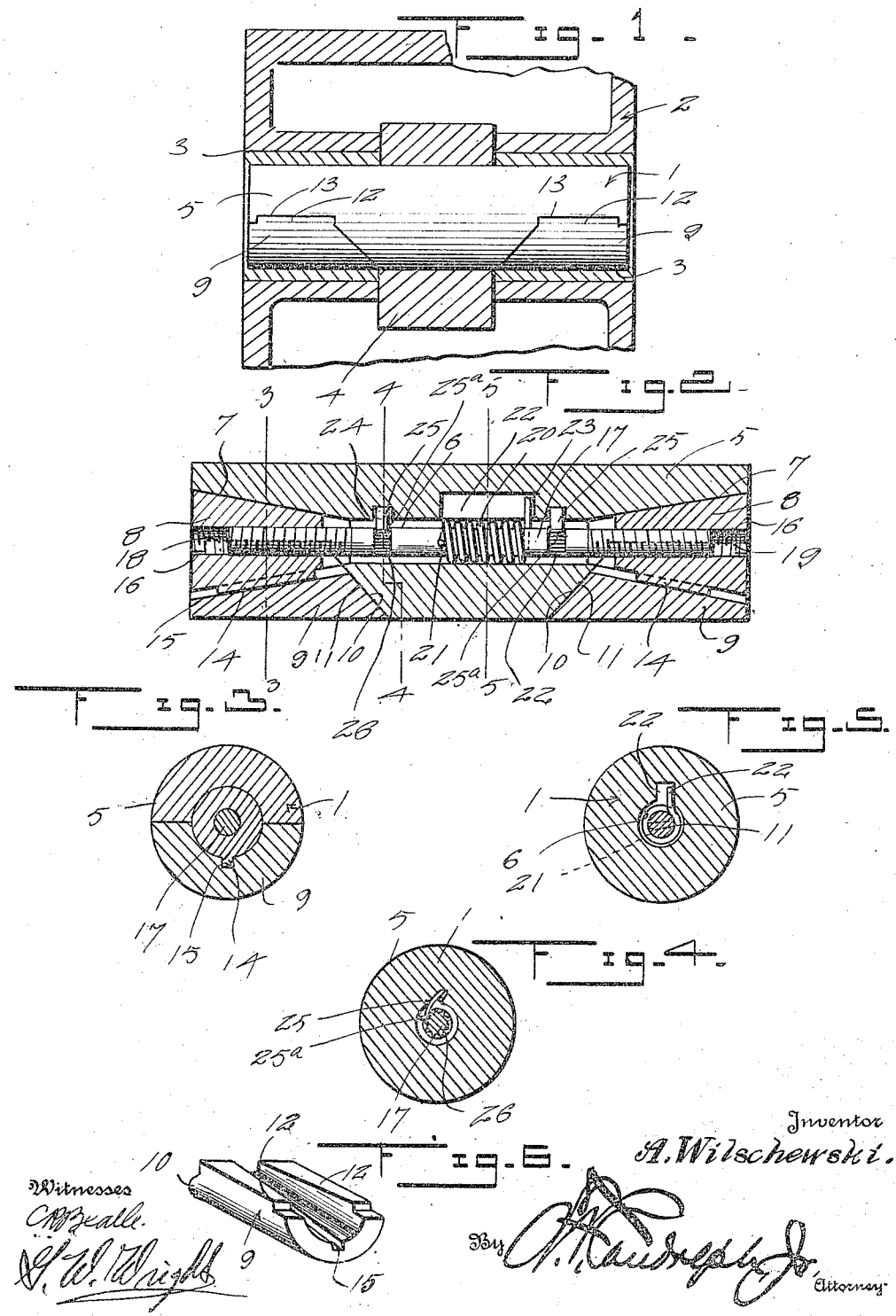

ALEXANDER WILSCHEWSKI, OF EDNA, MINNESOTA.

SELF-ADJUSTING PISTON-PIN.

1,288,786.

Specification of Letters Patent.  Patented Dec. 24, 1918.

Application filed November 16, 1917. Serial No. 202,322.

*To all whom it may concern:*

Be it known that I, ALEXANDER WILSCHEWSKI, a citizen of the United States, residing at Edna, in the county of Ottertail and State of Minnesota, have invented certain new and useful Improvements in Self-Adjusting Piston-Pins; and I do hereby declare the following to be a full, clear, and exact description of the invention, such as will enable others skilled in the art to which it appertains to make and use the same.

This invention relates to wrist pins and more particularly for wrist pins especially adapted for connecting the piston rod with the piston head of an internal combustion engine and the primary object of the invention is to provide a self adjusting wrist pin, which will automatically take up the wear in the bearings in the piston and thus provide a tight connection between the wrist pin and the piston and thus eliminate the troubles occurring from loose connections.

A further object of the invention is to provide a self adjusting wrist pin, which is so formed that the ends of the same will expand as the bushings gradually wear in the piston and thus provide a tight connection between the wrist pin and piston head.

A still further object of the invention is to provide a self adjusting wrist pin which includes a hollow pin having the ends of the bore thereof tapered outwardly and cones slidably mounted in the tapered ends, portions of said pin being made detachable and bearing against the cones, and means positioned in the bore of the pin for engaging said cones to draw the same toward each other when wear on the bushings in the piston occurs, thus engaging the sections of the pin and force the same outwardly against the bushing and thus take up the wear.

A still further object of the invention is to provide a self adjusting wrist pin of the above character, which is durable and efficient in use, one that is simple and easy to construct, and one that can be placed upon the market at a reasonable price.

With these and other objects in view, the invention consists in the novel construction, arrangement and formation of parts, as will be hereinafter more specifically described, claimed and illustrated in the accompanying drawings, forming a part thereof, in which:

Figure 1 is a side elevation of an improved wrist pin in assembled position and showing the same attached to a piston.

Fig. 2 is a longitudinal section through the improved wrist pin.

Fig. 3 is a transverse section taken on the line 3—3 of Fig. 2.

Fig. 4 is a transverse section taken on the line 4—4 of Fig. 2.

Fig. 5 is a transverse section taken on the line 5—5 of Fig. 2, and

Fig. 6 is a detail perspective view of one of the detachable end expanding members of the wrist pin.

Referring to the drawing in detail, wherein similar reference numerals designate corresponding parts throughout the several views, the numeral 1 generally indicates the improved wrist pin which is carried by the piston 2. The ends of the wrist pin 1 are rotatably received in the bushings or bearings 3 positioned in the piston 2 and the wrist pin has keyed thereto the piston rod 4.

The improved wrist pin 1 includes a substantially cylindrical body 5 having a longitudinally extending bore 6 therethrough. The outer ends of the bore 6 are tapered outwardly as at 7 to conform to the contour of the frusto-conical members 8, which are slidably mounted therein. The cylindrical body 5 carries detachable end sections 9, which extend from the central longitudinal axis of the body to the bottom thereof and these sections have their inner ends beveled downwardly, as at 10 which engage inclined surfaces 11 of the body. The end sections 9 are adapted to engage the bushings 3 for a purpose which will hereinafter be more clearly described. The upper edges of the sections 9 are provided with lugs 12 which fit in recesses 13 which are formed in the lower edges of the body 5 and these lugs prevent any relative longitudinal movement of the sections. Each of the frusto-conical members 8 have formed on their outer surfaces relatively long and narrow lugs 14, which are slidably received in longitudinally extending grooves 15 formed in the inner surfaces of the sections 9 and these lugs 14 prevent rotation of the frusto-conical members 8 in relation to the body 5 and the sections 9. Each of the frusto-conical members 8 are provided with internally threaded bores 16 which are in alinement with the bore 6 of the cylindrical body. One of the threaded bores 16 of the frusto-conical members is provided with right hand threads while the bore of the other frusto-conical member 8 is provided with left hand threads, for a purpose which will hereinafter be more fully described.

Rotatably mounted in the bore 6 of the cylindrical member 5 is a bolt 17 which has one end thereof provided with right hand threads 18 and the other end provided with left hand threads 19 adapted to be threaded into the bores of the frusto-conical members 8. Coiled around the central portion of the bolt 17 is a helical spring 20 which has one end rigidly secured to the bolt as at 21 and the other end received in a slot 22 formed in the cylindrical body 5 as at 23 and this spring normally tends to rotate the bolt and the cylindrical body 5 in opposite directions and thus thread the frusto-conical members 8 on the bolt, so as to bring the same toward each other. Recesses 24 are provided in the bore 6 of the cylindrical member 5 on each side of the slot 22 and positioned in these recesses are leaf springs 25 which bear against relatively small ratchet teeth 26 formed on the bolt on each side of the coil spring 20 and these springs 25 prevent the bolt 17 from rotating in a direction which would tend to push the frusto-conical members 8 away from each other. The free ends of the springs 25 are bent outwardly as at 25ª, so that the springs will slip over the ratchet teeth 26, when the bolt is forcibly rotated in a reverse direction.

In operation of the improved wrist pin the same is positioned on the bushings 3 of the piston 2 as shown in Fig. 1 and the frictional engagement between the pin 1 and the bushings 3 tends to prevent rotation of the bolt 17, but as soon as a slight wear occurs in the bushings 3 the spring 20 tends to slightly rotate the bolt 17 and thus slightly move the frusto-conical members 8 toward each other, which forces the sections 9 outwardly and thus takes up any wear which occurs in the bushings.

In practice, I have found that the form of my invention, illustrated in the accompanying drawings and referred to in the above description, as the preferred embodiments, is most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention as set forth.

What I claim as new is:—

1. A wrist pin comprising separate sections and means tending to separate said sections, as and for the purpose specified.

2. A wrist pin comprising separate sections, and means carried by the wrist pin for separating said sections, as and for the purpose specified.

3. In combination with a piston and piston rod, a wrist pin, bushings thereon, said wrist pin including a plurality of sections and means for normally holding the sections in engagement with the bushings to take up the wear of the same.

4. A wrist pin comprising a cylindrical body, separate end sections carried by the body, and spring means normally tending to separate said sections from the body, as and for the purpose specified.

5. A wrist pin comprising a cylindrical body having a longitudinally extending bore, detachable sections carried by the body, expanding members carried by the body tending to separate said sections from the body, and means tending to draw said expanding members toward each other.

6. A wrist pin comprising a cylindrical body, having a longitudinally extending bore, the ends of said bore being flared outwardly, frusto-conical members seated in said flared portions of the bore, detachable end sections carried by the body engaging said frusto-conical members, a bolt carried by the body and positioned in said bore, the ends of said bolt being provided with right and left threads, said conical members being threaded on said bolt, and spring means normally tending to rotate said bolt, as and for the purpose specified.

In testimony whereof I affix my signature in presence of two witnesses.

ALEXANDER WILSCHEWSKI.

Witnesses:
A. F. LADWIG,
WARREN DENZER.